(12) United States Patent
Achten et al.

(10) Patent No.: US 8,013,070 B2
(45) Date of Patent: Sep. 6, 2011

(54) CROSSLINKABLE COMPOSITIONS, THERMOPLASTIC ELASTOMERS OBTAINABLE THEREFROM AND THEIR USE

(75) Inventors: Dirk Achten, Köln (DE); Claus Wrana, Köln (DE); Kay Varnhorn, Leverkusen (DE); Stephen Pask, Dormagen (DE); Carsten Fischer, Odenthal (DE)

(73) Assignee: LANXESS Deutschland GmbH, Leverkusen (DE)

( * ) Notice: Subject to any disclaimer, the term of this patent is extended or adjusted under 35 U.S.C. 154(b) by 1011 days.

(21) Appl. No.: 11/515,055

(22) Filed: Sep. 1, 2006

(65) Prior Publication Data

US 2007/0055018 A1  Mar. 8, 2007

(30) Foreign Application Priority Data

Sep. 6, 2005 (DE) .......................... 10 2005 042 265

(51) Int. Cl.
*C08L 77/00* (2006.01)
*C08L 9/02* (2006.01)

(52) U.S. Cl. ........ 525/230; 525/232; 525/233; 525/238; 525/387; 526/335; 526/341

(58) Field of Classification Search .................. 525/230, 525/232, 233, 238, 387; 526/335, 341
See application file for complete search history.

(56) References Cited

U.S. PATENT DOCUMENTS

| | | | |
|---|---|---|---|
| 2,849,426 A | 8/1958 | Miller | |
| 3,700,637 A | 10/1972 | Finch, Jr. ..................... | 260/83.3 |
| 4,464,515 A | 8/1984 | Rempel et al. ................ | 525/338 |
| 4,503,196 A | 3/1985 | Rempel et al. ................ | 525/338 |
| 4,508,867 A | 4/1985 | Sato .............................. | 524/434 |
| 4,581,417 A | 4/1986 | Buding et al. ................ | 525/338 |
| 4,631,315 A | 12/1986 | Buding et al. ................ | 525/338 |
| 4,746,707 A | 5/1988 | Fiedler et al. ................. | 525/338 |
| 4,795,788 A | 1/1989 | Himmler et al. .............. | 525/338 |
| 4,812,528 A | 3/1989 | Rempel et al. ................ | 525/338 |
| 4,826,910 A | 5/1989 | Schwarz | |
| 4,952,634 A | 8/1990 | Grossman | |
| 4,978,771 A | 12/1990 | Fiedler et al. ................. | 558/459 |
| 5,157,083 A | 10/1992 | Apnuma et al. ............... | 525/285 |
| 6,410,653 B1 | 6/2002 | Fujii et al. ..................... | 525/285 |
| 6,566,463 B1 | 5/2003 | Hwang ......................... | 526/124.2 |
| 6,683,136 B2 | 1/2004 | Guo et al. ..................... | 525/329.3 |
| 2002/0132892 A1 | 9/2002 | Fuchs | |
| 2003/0134979 A1 | 7/2003 | Ferrari et al. ................. | 525/178 |
| 2003/0171500 A1 | 9/2003 | Guo et al. ..................... | 525/329.1 |
| 2003/0181558 A1 | 9/2003 | von Hellens | |
| 2004/0229999 A1* | 11/2004 | Achten et al. ................. | 525/55 |
| 2006/0128894 A1* | 6/2006 | Nasreddine et al. .......... | 525/178 |
| 2007/0072998 A1 | 3/2007 | Masuda et al. | |

FOREIGN PATENT DOCUMENTS

DE  25 39 132  3/1977
EP  0471 250  2/1992

OTHER PUBLICATIONS

Journal of Applied Polymer Science, vol. 86, 2887-2897 (2002); M. Fujiyama et al; "Rheological Properties of Ionoically Crosslinked Poly(propylene)-Type Thermoplastic Elastomers".
Polymer 41 (2000) 787-793, P. Anthony, S. Bandyopadhyay, S.K. De; "Synergism in properties of ionomeric polyblends based on zinc salts of carboxylated nitrile rubber and poly(ethylene-co-acrylic acid)".
Journal of Applied Polymer Science vol. 87, 805-813 (2003);L. Ibarra, M. Alzorriz; "Ionic Elastomers Based on Carboxylated Nitrile Rubber and Calcium Oxide".
Journal of Elastomers and Plastics, vol. 33, 196-210; Prince Anthony, S. Datta, A. Bhattacharya and S.K. De; Mixed Crosslinking in Chlorosulfonated Polyethylene and Its Blend with Ethylene Vinyl Acetate Copolymer.
European Search Report from co-pending Application EP06018188.0 dated May 12, 2006, 6 pages.

* cited by examiner

*Primary Examiner* — Robert D. Harlan
(74) *Attorney, Agent, or Firm* — Jennifer R. Seng

(57) ABSTRACT

Novel crosslinkable compositions are provided and are based on thermoplastic polymers and elastomers, these compositions comprising, as crosslinking system, specific organic salts of metal ions. Ionically crosslinked thermoplastic elastomers can be obtained therefrom and have excellent physical properties, high-temperature resistance extending above 150° C., and also oil resistance. They can be used for production of moldings.

21 Claims, 3 Drawing Sheets

Figure 1:
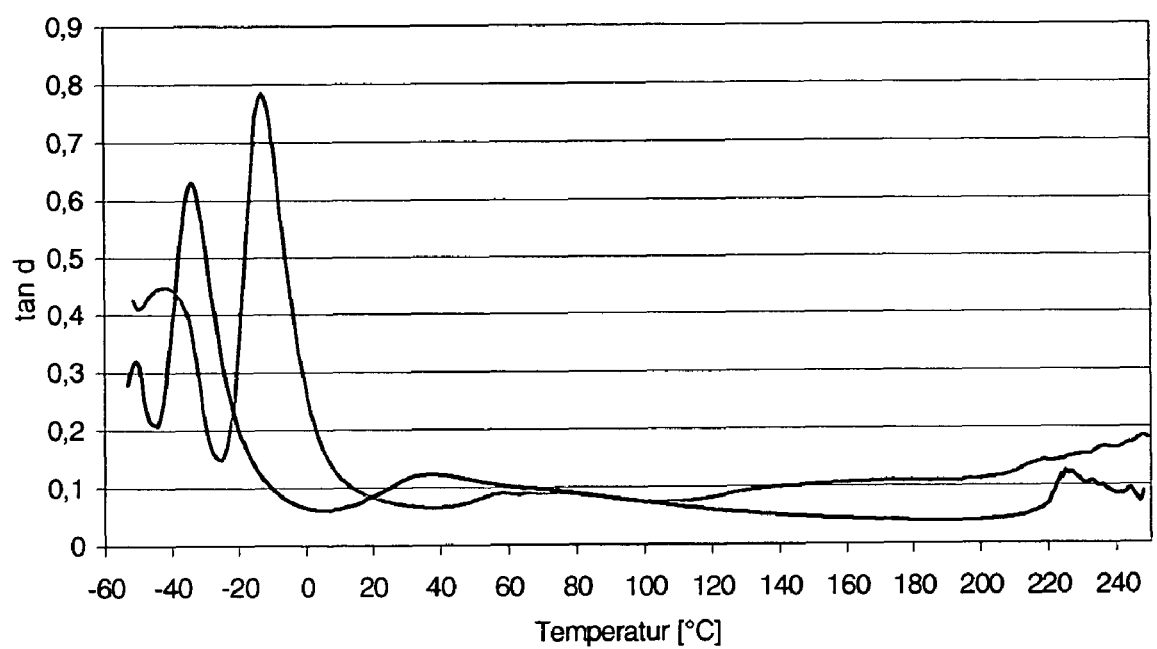

Transition electron micrograph of Zeotherm™ 100-80B and of the thermoplastic elastomer based on inventive Example 1.

Polyamide = dark phase
Rubber = light phase 2a
2b

CROSSLINKABLE COMPOSITIONS, THERMOPLASTIC ELASTOMERS OBTAINABLE THEREFROM AND THEIR USE

FIELD OF THE INVENTION

The invention relates to crosslinkable compositions based on thermoplastic polymers and elastomers, these compositions comprising, as crosslinking system, exclusively specific organic salts of metal ions, and also relates to the preparation of these crosslinkable compositions. The invention further relates to a process for crosslinking of these compositions to give a thermoplastic elastomer with an elastomer phase and with a thermoplastic phase, where the elastomer phase has been crosslinked via the organic salts of the metal ions. The invention further relates to the thermoplastic elastomers per se, and also to their use for production of mouldings.

BACKGROUND OF THE INVENTION

There is a major requirement for thermoplastically processable elastomers which combine the processing properties of thermoplastics with the elastic properties of the irreversible crosslinked materials (often also termed thermoset materials), e.g. in the form of conventionally crosslinked rubber products.

The person skilled in the art is aware of various classes of what are known as thermoplastic elastomers.

One class of these thermoplastic elastomers is provided by what are known as "TPEs". These are thermoplastic elastomers based on polymers which simultaneously have a) a crystalline and/or amorphous phase whose melting point or glass transition temperature is above room temperature, and also b) have an amorphous phase whose glass transition temperature is below room temperature, the crosslinking of the phases a) and b) taking place by way of the thermoplastic phase a), physical crosslinking being involved here.

Another class of the thermoplastic elastomers is provided by what are known as "TPVs". These are thermoplastic vulcanizates which comprise mixtures composed of a) crystalline and/or amorphous polymers whose melting point or glass transition temperature is above room temperature and b) amorphous polymers whose glass transition temperature is below room temperature, the amorphous polymers b) having been chemically crosslinked, and this mixture being present with co-continuous phase morphology or having the solid phase as continuous phase.

From the point of view of the user, there is a major requirement for products which combine high-temperature resistance with oil resistance and barrier properties. The conventional products hitherto mainly involve thermoplastic vulcanizates based on polyamides or on polyesters or polypropylene as thermoplastic phase. In these TPVs, there is chemical crosslinking of the elastomeric phase, for example via resins, peroxides, sulphur, diamines or epoxides. In these systems, precondition has to be met in order to obtain the desired property of thermoplastic processability, is that of a continuous or at least co-continuous phase of the thermoplastic material, where the thermoplastic must substantially surround the elastomer phase. In order to achieve this, the elastomeric phase is irreversibly chemically crosslinked during the preparation process. For the desired products intended for use at very high temperatures, a necessary precondition is the use of high-melting-point thermoplastic phases whose melting point or glass transition temperature is >200° C., and this considerably restricts the choice of crosslinking systems and preparation processes. A multistage process has therefore frequently been needed hitherto to achieve the desired properties and the necessary phase morphologies. Reproducibility of the results is accordingly poor.

The crosslinking system used exerts considerable influence.

A known main class of conventional crosslinking systems is provided by free-radical crosslinking systems which operate with use of organic peroxides, with additional use of co-agents to improve free-radical yield.

Another class of even more widely used crosslinking systems is provided by the sulphur crosslinking systems. As is well known to the person skilled in the art, these can be used in a large number of different compositions.

Less commonly used crosslinking systems are those based on amino crosslinking by means of sterically hindered amines, e.g. [Diak 1] (hexamethylenediamine carbamate) in combination with [DOTG] (diorthotolylguanidine). These crosslinking systems are recommended specifically for the crosslinking of elastomers containing carboxy groups, e.g. AEM (e.g. in the form of VAMAC®).

All of the abovementioned crosslinking systems bring about irreversible crosslinking of the elastomeric phase.

A substantial disadvantage of crosslinking by means of peroxides for the possibility desired above of crosslinking above 200° C. is that the crosslinking must take place with exclusion of air in order to avoid a reduction in crosslinking efficiency via reaction with atmospheric oxygen, the discernible result of which is, for example, formation of surface tack. Another significant aspect of peroxide crosslinking is the firm relationship between temperature and decomposition rate. While achievement of a suitable crosslinking rate has a relatively low temperature (<180° C.) is relatively easy to achieve via selection of a suitable peroxide, it is very difficult to find suitable peroxides, i.e. peroxides that react selectively with the rubber phase, for controlled crosslinking reactions at or above 200° C. Peroxides commonly used in the rubber industry for the crosslinking of rubbers are unsuitable for these high-temperature reactions by virtue of explosive decomposition kinetics. This method cannot ensure homogeneous dispersion of the peroxides in the elastomeric phase during the mixing process of thermoplastic and elastomer phase at high temperatures. Other high-temperature peroxides often exhibit only unsatisfactory crosslinking efficiency with the rubbers under consideration, or are not commercially available. Products produced by means of peroxidic crosslinking often moreover feature strong undesirable odor, deriving from the decomposition products of the peroxides.

Another method of carrying out high-temperature crosslinking reactions uses chemical condensation or chemical addition processes on reactive polymers which by way of example have hydroxy or carboxy groups as functional groups, by means of reactive chemical cross-linking agents based on di-, tri- or polyfunctional epoxides, amines, carboxylic salts, or isocyanates. A disadvantage here is that the products used often have considerable toxicity.

The constituents needed for typical sulphuric crosslinking are many and varied and encompass sulphur, sulphur donors, accelerators, retarders, antireversion agents and other substances. However, vulcanization temperatures beyond 180° C. are not commonly used because control of the reaction and of the process is very difficult at temperatures as high as this.

Production of thermoplastic vulcanizates based on PP and EPDM by means of what is known as resin crosslinking often uses phenyl-formaldehyde resins together with stanus dichloride ($SnCl_2$) as Lewis acid catalyst. Although these systems are very widespread they have the serious disadvantage of producing severely discoloured products often with a yellowish brown hue and of liberating corrosive chlorine compounds. They therefore have limited applicability.

The term reactive crosslinking is used for crosslinking processes during high-temperature mixing of elastomers or of elastomers and thermoplastics. This step is significant for the production of thermoplastic vulcanizates.

Another new class of thermoplastic elastomers is provided by ionically crosslinked thermoplastic elastomers, which are also termed thermoplastic ionomers. These involve mixtures composed of ionomeric thermoplastics and of elastomers containing carboxy groups or containing sulphonic acid groups and mostly based on polypropylene-(PP)- and polyethylene-(PE)-based copolymers whose phases are coupled by way of ionic bonds. These ionically linked thermoplastic elastomers have been previously disclosed.

By way of example, WO-A-03/020820 describes blends composed of a polyamide with a hydrogenated carboxylated nitrile rubber based on a nitrile monomer, on a diene comonomer, and also on an unsaturated carboxylic acid as termonomer.

The literature has previously described the use, for the crosslinking of elastomers bearing carboxy groups, of mixtures composed of known crosslinking systems, e.g. those based on sulphur compounds, which bring about covalent crosslinking, and metal salts, which bring about additional ionic crosslinking.

U.S. Pat. No. 4,508,867 discloses vulcanizable rubbery compositions which encompass a crystalline polyamide, and also a synthetic, rubbery polymer based on acrylnitrile or methacrylnitrile, on butadiene and on one or more $\alpha,\beta$-unsaturated carboxylic acids as monomers and moreover also comprise a combination of active sulphur-vulcanization agents, and also of non-polymeric additives based on metal salts/compounds. The amounts of these non-polymeric additives are from 0.1 to 15% by weight, based on the polyamide, of an additive which has been selected from the halides of lithium, magnesium, calcium and zinc, and about 1-10 parts by weight, based on 100 parts by weight of all of the polymeric materials, of an additive which has been selected from the oxides and hydroxides of magnesium, calcium, barium and zinc and from the peroxides of calcium and zinc. U.S. Pat. No. 4,508,867 states that these additives affect the melting point of the polyamide or else the compatibility of the polyamide and of the rubbery polymer.

U.S. Pat. No. 6,566,463 discloses specific metal salts of unsaturated carboxylic acids which together with peroxides are suitable for the crosslinking of rubbers. The specific metal salts are obtained via reaction of 2 mol of a monobasic unsaturated carboxylic acid and 2 mol of a dibasic unsaturated carboxylic acid with 3 mol of a divalent metal oxide.

The sole use of divalent metal salts for achievement of ionic crosslinking is also known from the literature:

Polymer Engineering and Science, May 1999, Vol. 39, No 5, 963-973 discloses ionomeric thermoplastic elastomers based on ionomeric polymer blends of zinc salts of maleated polypropylene ("Zn-mPP") and of maleated EPDM rubber ("Zn-mEPDM"). The ionic crosslinking at the interfaces is brought about via addition of zinc oxide and stearic acid.

Journal of Applied Polymer Science, Vol. 86, 2887-2897 (2002) discloses that a polypropylene-based elastomer can be grafted with maleic anhydride, and the resultant maleated product can be crosslinked via additional of metal salts, such as aluminium stearate, magnesium stearate, calcium stearate, zinc stearate, potassium stearate, sodium stearate, magnesium hydroxide, zinc oxide or zinc sulphide.

Polymer 41 (2000) 787-793 moreover says that ionomeric polyblends composed of zinc-oxide-neutralized carboxylated nitrile rubber ("Zn-XNBR") and of zinc-oxide-neutralized poly(ethylene-co-acrylic acid) ("Zn-PEA") behave as ionomeric thermoplastic elastomers. Here again, the ionic crosslinking at the interfaces is brought about via addition of zinc oxide and stearic acid.

J. Applied Polymer Science, Vol 87, 805-813 (2003) also says that carboxylated nitrile rubber can be crosslinked ionically using calcium oxide and stearic acid. According to Polym. Int. 49, 1653-1657 (2000) carboxylated nitrile rubber is converted into an ionically crosslinked elastomer using calcium oxide, magnesium oxide or zinc oxide in the presence of dioctyl phthalate or dimethyl sulphoxide as plasticizer.

However, the result of this crosslinking of the elastomer phase exclusively via oxides of divalent metals and their organic salts is polymer blends which feature high loss factors in dynamically loaded products and with this an undesired high level of dynamic heating. Although synergies are found for the crosslinking reaction with zinc oxide and with organic acids in the crosslinking of blends of various thermoplastic and elastic ionomers, partial dissociation of the ionic carbons in the temperature range as low as from 170° C. to 180° C. is presumed and is inimical to use in ionomers having high-temperature resistance.

Journal of Elastomers and Plastics, Vol. 33, 196-210 discloses that chlorosulphonated polyethylene (CSM) can be reacted with aluminium oxide in the presence of stearic acid, giving an ionic elastomer. There is also a description of a "mixed crosslinking reaction", i.e. formation of a vulcanizate having two different types of crosslinking, using dicumyl peroxide (DCP) and also using aluminium oxide/stearic acid. Mixed crosslinking using a combination of DCP and aluminium oxide/stearic acid is also required for the production of blends: an appropriate blend is obtained via intensive mixing of a masterbatch composed of CSM/aluminium oxide/stearic acid and of a masterbatch composed of ethylene-vinyl acetate copolymer (EVA)/DCP. However, when the purely ionic crosslinking reaction is carried out using aluminium oxide/stearic acid, it is said that materials with inadequate compressive deformation properties are obtained.

SUMMARY OF THE INVENTION

Starting from the known prior art, an object is to find vulcanizable compositions which are based on a non-peroxidic crosslinking system and which can be used at high temperatures to prepare thermoplastic elastomers which are easy to handle and are not hazardous to health and which moreover can give low process risk. The thermoplastic elastomers obtainable via the crosslinking reaction are intended to be equivalent or superior to the properties available in the market in their high-temperature and oil-resistant properties and also in their mechanical properties, odour and intrinsic colour, and are also intended to be capable of simple and low-cost manufacture.

This object is achieved via provision of crosslinkable compositions based on thermoplastic polymers and on elastomers containing carboxy groups, which also comprise specific organic salts of metal ions, and also comprise a crosslinking system.

DETAILED DESCRIPTION OF THE INVENTION

The invention provides crosslinkable compositions comprising
(1) one or more thermoplastic polymers
(2) one or more elastomers which have carboxy groups, and also
(3) as crosslinking system, one or more salts of the general formula (I)

$$(R^{y-})_{x/y}M^{x+} \quad (I)$$

in which
  $R^{y-}$ Is a $C_1$-$C_{26}$ hydrocarbon radical which has y carboxy groups,
  y can be the values 1, 2, 3 or 4,
  x is 3 or 4 and
  M is a tri- or tetravalent metal.

Preference is given to crosslinkable compositions comprising
(1) from 10 to 90% by weight of one or more thermoplastic polymers
(2) from 89 to 9% by weight of one or more elastomers which have carboxy groups, and
(3) from 1 to 40% by weight of a crosslinking system which involves one or more salts of the general formula (I)

$$(R^{y-})_{x/y}M^{x+} \quad (I)$$

in which
  $R^{y-}$ is a $C_1$-$C_{26}$ hydrocarbon radical which has y carboxy groups,
  y can be the values 1, 2, 3 or 4,
  x is 3 or 4 and
  M is a tri- or tetravalent metal,
where the entirety of the three components (1), (2) and (3) gives 100% by weight.

Particular preference is given to crosslinkable compositions comprising
(1) from 15 to 80% by weight of one or more thermoplastic polymers
(2) from 83 to 18% by weight of one or more elastomers which have carboxy groups, and
(3) from 2 to 30% by weight of a crosslinking system which involves one or more salts of the general formula (I)

$$(R^{y-})_{x/y}M^{x+} \quad (I)$$

in which
  $R^{y-}$ is a $C_1$-$C_{26}$ hydrocarbon radical which has y carboxy groups,
  y can be the values 1, 2, 3 or 4,
  x is 3 or 4 and
  M is a tri- or tetravalent metal,
where the entirety of the three components (1), (2) and (3) gives 100% by weight.

M in the general formula (1) is preferably B, Al, Sc, Y, Fe, Sn, Pb, Ti, Zn, or Hf.

The radical $R^{y-}$ in the general formula (I) is preferably a $C_1$-$C_{26}$ hydrocarbon radical which contains y carboxy groups, where y can assume the value 1, 2, 3 or 4. The $C_1$-$C_{26}$ hydrocarbon radical can be straight-chain or branched, saturated or else mono- or polyunsaturated, acyclic or cyclic, aliphatic or aromatic.

$R^{y-}$ is preferably formate, acetate, acrylate, methacrylate, propionate, lactate, crotonate, pivalate, capronate, sorbate, caprylate, oleate, caprate, laurate, linolate, palmate, stearate, resinate, hexacosanate, icopentenate, eicosapentanate, oxalate, malonate, maleate, fumarate, succinate, glutarate, adipate, salicylate, pimelate, terephthalate, isophthalate, citrate, pyromellitate.

The crosslinking system (3) of the inventive crosslinkable composition can comprise one or more salts of the general formula (I). A feature of one particularly preferred crosslinkable composition is that it comprises, as crosslinking system, exclusively component (3), i.e. comprises no other crosslinking systems.

Thermoplastic polymers (1) that can be used are any of the conventional thermoplastic polymers whose melting point or glass transition temperature is >90° C., preferably >120° C. Preference is given to polyamides, polyesters, polyimides and polypropylene. These thermoplastic polymers can have been modified in a manner known to the person skilled in the art, for example with glass fibres, plasticizers, fillers, and stabilizers. For the purposes of this application, the term "thermoplastic polymers" as component (1) of the inventive vulcanizable composition can therefore, if appropriate, also mean a mixture composed of the actual thermoplastic polymer and, for example, of the abovementioned auxiliaries or abovementioned additives. In relation to the statements concerning the amounts of component (1) in the inventive vulcanizable composition, the meaning here is in particular that, of the abovementioned 10-90% by weight or preferably 15-80% by weight of one or more thermoplastic polymers, the actual thermoplastic(s) in turn make up only a certain proportion, the remainder being made by glass fibres, plasticizers, fillers, stabilizers.

Polyamides that can be used in the inventive composition are homo- or copolymers whose main polymer chain contains monomer units linked by way of amide bonds (—C(═O)—NH—). Examples of polyamides which can be used are polycaprolactam (nylon-6), polylaurolactam (nylon-12), polyhexamethyleneadipamide (nylon-6,6), polyhexamethyleneazelamide (nylon-6,9), polyhexamethylenesebacamide (nylon-6,10), polyhexamethyleneisophthalamide (nylon-6,IP), polyaminoundecanoic acid (nylon-11), polytetramethyleneadipamide (nylon-4,6) and also copolymers of caprolactam, hexamethylenediamine and adipic acid (nylon-6,66), and aramids, such as polyparaphenyleneterephthalamide. Most of the polyamides have softening points and melting points in the range from 120 to 260° C. The polyamides preferably have high molecular weight and are crystalline.

Polyesters that can be used in the inventive composition are homo- or copolymers whose main polymer chain has monomer units linked by way of ester groups (—C(═O)—O—). Examples of homopolyesters that can be used are the hydroxycarboxylic acid types or dihydroxy-dicarboxylic acid types. The former can be prepared via polycondensation of an ω-hydroxycarboxylic acid or via ring-opening polymerization of cyclic esters (lactones), and the latter via polycondensation of two complementary monomers, e.g. a diol and a saturated or unsaturated dicarboxylic acid.

Polymers that can be used are poly(ethylene terephthalate), poly(oxy-1,2-ethanediyloxy-carbonyl-1,4-phenylenecarbonyl), poly(1,4-dimethylenecyclohexane terephthalate), poly(butylene terephthalate), poly(tetramethylene terephthalate), poly(oxy-1,4-butanediyloxy-carbonyl-1,4-phenylenecarbonyl), (see also *Ullmann's Encyclopedia of Industrial Chemistry* Copyright© 2002 DOI: 10.1002/14356007.a21_227 Article Online Posting Date: Jun. 15, 2000).

Polyimides that can be used in the inventive composition are homo- or copolymers whose main polymer chain contains monomer units linked by way of imide groups. The imide groups here can take the form of linear or cyclic units. The melting points of the suitable polyimides are in the range from 150 to 260° C. (See also *Ullmann's Encyclopedia of Indus-* trial Chemistry Copyright © 2002 by Wiley-VCH Verlag GmbH & Co. KGaA.DOI: 10.1002/14356007.a21_253).

Polypropylenes that can be used in the inventive composition are any of the polypropylenes whose melting point is >150° C. and which have a high proportion of crystallinity.

Polyethers that can be used in the inventive composition are homo- or copolymers whose main polymer chain contains monomer units linked by way of ether groups (C—O—C), and which feature a melting point greater than about 150° C. and below about 260° C.

Elastomers (2) that can be used are one or more of the typical elastomers that contain carboxy groups.

It is of decisive importance that the elastomer contains carboxy groups bonded to the polymer chains.

The elastomer usually contains from 0.5 to 15% by weight, based on 100% by weight of elastomer (2), of carboxy groups.

The elastomer preferably contains from 0.5 to 10% by weight, particularly preferably from 1 to 7% by weight and in particular from 2 to 5% by weight, of carboxy groups, based on 100% by weight of elastomer (2).

These carboxy groups can have a random distribution along the polymer chain of the elastomer, but their location can also be at the chain ends.

Examples of elastomers that can be used and contain carboxy groups are:
1. carboxylated nitrile rubber (also abbreviated to XNBR)
2. hydrogenated, carboxylated nitrile rubber (also abbreviated HXNBR)
3. maleic-anhydride-("MAH")-grafted rubbers based on EPM, EPDM, HNBR, EVA, EVM, SBR, NR or BR
4. carboxylated styrene-butadiene rubber (also abbreviated to XSBR)
5. AEM having free carboxy groups
6. ACM having free carboxy groups
and also any desired mixture of the abovementioned polymers.

The Mooney viscosity (ML 1+4 @ 100° C.) of the elastomers (2) used is usually in the range from 1 to 140, preferably in the range from 5 to 100, particularly preferably in the range from 30 to 90.

The elastomers mentioned are freely available commercially. Suitable elastomers can by way of example be found in Rubber Handbook, SGF 10$^{th}$ Edition, or are obtainable with the trade marks Krynac® (from Lanxess Deutschland GmbH), Therban® (from Lanxess Deutschland GmbH), Exxelor® (from Exxon), Fusabond® (from DuPont), Elvaloy® (from DuPont), Levapren® (from Lanxess Deutschland GmbH), Baystal® (from Lanxess Deutschland GmbH), Vamac® (from DuPont), HyTemp® (from Nippon Zeon), Elvax® (from DuPont).

The elastomers mentioned are also obtainable by way of preparation processes known to the person skilled in the art from the literature.

Carboxylated nitrile rubber (also termed XNBR) means rubbers which are terpolymers composed of at least one unsaturated nitrile, of at least one conjugated diene and of at least one other termonomer containing carboxy or carboxylate groups.

Any known α,β-unsaturated nitrile can be used as α,β-unsaturated nitrile, preference being given to ($C_3$-$C_5$) α,β-unsaturated nitriles such as acrylnitrile, methacrylnitrile, ethacrylnitrile or a mixture thereof. Acrynitrile is particularly preferred.

The conjugated diene can be of any type. It is preferably to use ($C_4$-$C_6$) conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. Very particular preference is given to 1,3-butadiene.

Examples of termonomers that contain carboxy or carboxylate groups and that can be used are α,β-unsaturated carboxylic acids or their esters. Preference is given here to fumaric acid, maleic acid, acrylic acid and methacrylic acid as acids, and also to their esters such as butyl acrylate, butyl methacrylate, etylhexyl acrylate and etylhexyl methacrylate. Other monomers that can be used are unsaturated dicarboxylic acids or derivatives thereof, such as esters or amides.

The proportions of conjugated diene and of α,β-unsaturated nitrile in the XNBR polymers can vary widely. The proportion of the, or of the entirety of the, conjugated diene(s) is usually in the range from 40 to 90% by weight and preferably in the range from 55 to 75% by weight, based on the entire polymer. The proportion of the, or of the entirety of the, α,β-unsaturated nitrile(s) is usually from 9.9 to 60% by weight, preferably from 15 to 50% by weight, based on the entire polymer. The amounts present of the additional monomers are from 0.1 to 40% by weight, preferably from 1 to 30% by weight, based on the entire polymer. The proportions of all of the monomers in each case give a total of 100% by weight.

The preparation of XNBR via polymerization of the abovementioned monomers is well known to the person skilled in the art and is extensively described in the literature (e.g. EP-A-0 933 381 or U.S. Pat. No. 5,157,083; Nippon Zeon).

Hydrogenated carboxylated nitrile rubbers (also abbreviated to HXNBR) are obtainable in various ways. An example of a possibility is to graft an HNBR with compounds containing carboxy groups. They can moreover be obtained via hydrogenation of carboxylated nitrile rubbers. These hydrogenated carboxylated nitrile rubbers are described by way of example in WO-A-01/77185.

In principle it is possible to carry out the hydrogenation with use of homogeneous or heterogeneous hydrogenation catalysts.

As described in WO-A-01/77185, it is possible by way of example to carry out the reaction with hydrogen with use of homogeneous catalysts, e.g. with the catalyst known as "Wilkinson" catalyst (($PPh_3$)$_3$RhCl) or with other catalysts. Processes for hydrogenation of nitrile rubber are known. Rhodium or titanium are usually used as catalysts, but it is also possible to use platinum, iridium, palladium, rhenium, ruthenium, osmium, cobalt or copper either in the form of metal or else preferably in the form of metal compounds (see by way of example U.S. Pat. No. 3,700,637, DE-C-2 539 132, EP-A-134 023, DE-A-35 41 689, DE-A-35 40918, EP-A-298 386, DE-A-35 29 252, DE-A-34 33 392, U.S. Pat. No. 4,464, 515 and U.S. Pat. No. 4,503,196).

Suitable catalysts and solvents for homogeneous-phase hydrogenation are described below and are known from DE-A-25 39 132 and EP-A-0 471 250.

By way of example, selective hydrogenation can be achieved in the presence of a rhodium-containing catalyst. By way of example, it is possible to use a catalyst whose general formula is

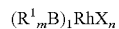

in which $R^1$ are identical or different and are a $C_1$-$C_8$-alkyl group, a $C_4$-$C_8$-cycloalkyl group, a $C_6$-$C_{15}$ aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, L is 2, 3 or 4, m is 2 or 3 and n is 1, 2 or 3, preferably 1 or 3. Preferred catalysts are tris(triphenylphosphine)rhodium(I) chloride, tris(triphenylphosphine)-rhodium(III) chloride and tris(dimethyl sulphoxide)-rhodium(III) chloride and also tetrakis(triphenylphosphine)rhodium hydride of the formula $(C_6H_5)_3P)_4RhH$ and the corresponding compounds in which the triphenylphosphine has been entirely or to some extent replaced by tricyclohexylphosphine. Small amounts of the catalyst can be utilized. A suitable amount is in the range from 0.01 to 1% by weight, preferably in the range from 0.03 to 0.5% by weight, and particularly preferably in the range from 0.1 to 0.3% by weight, based on the weight of the polymer.

It is usually advisable to use the catalyst together with a co-catalyst which is a ligand of the formula $R^1{}_mB$, where $R^1$, m and B are as defined above. It is preferable that m is equal to 3, and that B is equal phosphorus, and the radicals $R^1$ can be identical or different. Preference is given to co-catalysts having trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicyclalkylmonoaryl radicals.

Examples of co-catalysts are found by way of example in U.S. Pat. No. 4,631,315. Preferred co-catalyst is triphenylphosphine. The amounts preferably used of the co-catalyst are in the range from 0.3 to 5% by weight, preferably in the range from 0.5 to 4% by weight, based on the weight of the nitrile rubber to be hydrogenated. Preference is moreover given to a ratio by weight of the rhodium-containing catalyst to the co-catalyst in the range from 1:3 to 1:55, preferably in the range from 1:5 to 1:45. Based on 100 parts by weight of the nitrile rubber to be hydrogenated, a suitable amount used of the co-catalyst is from 0.1 to 33 parts by weight, preferably from 0.5 to 20, and very particularly preferably from 1 to 5 parts by weight, in particular more than 2, but fewer than 5 parts by weight, based on 100 parts by weight of the nitrile rubber to be hydrogenated.

The practical conduct of this hydrogenation is well known to the person skilled in the art from U.S. Pat. No. 6,683,136. In the usual method, the nitrile rubber to be hydrogenated is treated with hydrogen in a solvent such as toluene or monochlorobenzene at 100 to 150° C. and at a pressure of from 50 to 150 bar for from 2 to 10 h.

For the purposes of this application, "hydrogenation" or "hydrogenated" means at least 50%, preferably 75%, particularly preferably 85%, conversion of the double bonds initially present in the carboxylated nitrile rubber.

If heterogeneous catalysts are used for the preparation of hydrogenated carboxylated nitrile rubbers via hydrogenation of the corresponding carboxylated nitrile rubbers, they are usually supported catalysts based on palladium.

For the purposes of this application, the term "elastomer" as component (2) of the inventive vulcanizable composition can, if appropriate, also mean a mixture composed of the actual elastomer(s) and of other auxiliaries or other additives. In relation to the statements concerning the amounts of components (2) in the inventive vulcanizable composition, the meaning here is analogous to that of these statements for the thermoplastic polymers, particular that, of the abovementioned 89-9% by weight or preferably 83-18% by weight of one or more elastomers (2), the actual elastomer(s) in turn make(s) up only a certain proportion, the remainder being made up by the other auxiliaries or other additives.

Examples of optional further components that can be present in the elastomer phase are:
fillers commonly used in the rubber industry, e.g. carbon blacks, silica, talc, chalk or titanium dioxide
elastomers not functionalized by carboxy groups
plasticizers
processing aids
stabilizers and antioxidants
dyes or
fibres or fibre pulp It can be desirable to use an antioxidant in the inventive compositions. Examples of conventional antioxidants include p-dicumyldiphenylamine (Naugard® 445), Vulkanox® DDA (styreneated diphenylamine), Vulkanox® ZMB2 (zinc salt of methylmercaptobenzimidazol), Vulkanox®HS (polymerized 1,2-dihydro-2,2,4-trimethylquinoline) and Irganox® 1035 (thiodiethylene bis(3,5-di-tert-butyl-4-hydroxy)hydrocinnamate or thiodiethylene bis (3-(3,5-di-tert-butyl-4-hydroxyphenyl) propionate).

In one preferred embodiment the vulcanizable composition is one in which, as component (1), a polyamide is used and, as component (2), HXNBR or XNBR is used.

The invention further provides a process for preparation of these crosslinkable compositions by mixing all of the components (1), (2) and (3) at temperatures above the highest melting point or glass transition temperature of the thermoplastic polymer(s).

In a first preferred variant of the inventive process, component (1) and (2) are used as initial charge and are intimately mixed at temperatures above the highest melting point or glass transition temperature of the thermoplastic polymer(s), and component (3) is then added while continuing mixing and retaining the abovementioned mixing temperature.

In a second preferred variant of the inventive process, component (2) is used as initial charge and mixed to a temperature extending to just below the melting point or glass transition temperature of component (1). Component (1) is then added, the temperature is increased to a temperature greater than the highest melting point or glass transition temperature of component (1), and, only after components (2) and (1) have been intimately mixed, component (3) is finally added with continuation of mixing and with retention of the mixing temperature above the highest melting point or glass transition temperature of the thermoplastic polymer(s).

In a third preferred variant component (1) is used as initial charge and is heated to a temperature above the highest melting point or glass transition temperature of component (1), and then component (2) is added and component (1) and (2) are intimately mixed. Component (3) is then added with continuation of mixing and retention of the mixing temperature above the highest melting point or glass transition temperature of the thermoplastic polymer(s).

In a fourth preferred variant of the process, all three of the components can be simultaneously used as initial charge at a temperature above the highest melting point or glass transition temperature of the thermoplastic polymer(s) and can then be intimately mixed.

Components (1), (2) and (3) can be mixed with use of mixing systems known in rubber technology, e.g. internal mixers with intermeshing or tangential rotor geometry, or else can also be mixed in continuous-mixing assemblies, such as mixing extruders having from 2 to 4 screws.

In carrying out the inventive process it is important to ensure that the mixing temperature is sufficiently high that the thermoplastic component (1) is converted to the plastic state without undergoing any adverse effect. This is ensured if the temperature selected is above the highest melting point or glass transition temperature of the thermoplastic polymer(s). It has proven particularly successful to mix the components (1) to (3) at a temperature in the range from 200° C. to 250° C.

The mixing conditions should moreover have been selected in such a way that component (1) and (2) undergo maximum fineness of dispersion of the mixing constituents prior to the crosslinking of the elastomer phase. A typical particle size of the thermoplastic particles prior to the crosslinking is smaller than 5 micrometers, where the thermoplastic phase is present as a dispersion in the elastomer matrix, or there is co-continuous phase distribution.

The selection of the addition time, temperature and nature and amount of the crosslinking system should moreover be such that good dispersion of the crosslinking agent in the elastomer phase has been ensured, the elastomer phase and thermoplastic phase are present in the condition described above, and that the quantitative crosslinking of the elastomer phase takes place only thereafter, the result being that phase inversion takes place to give a co-continuous phase structure of the elastomer phase and thermoplastic phase, or that the elastomer phase is present in dispersed form with particles <5 μm in the thermoplastic phase.

Surprisingly, the inventive crosslinkable compositions have excellent suitability for provision of thermoplastic elastomers.

The invention therefore also provides a process for preparation of a thermoplastic elastomer based on one or more thermoplastic polymers and on one or more elastomers containing carboxy groups, by subjecting the inventive crosslinkable composition of the abovementioned type to a continued mixing procedure at a temperature which is above the highest melting point or glass transition temperature of the thermoplastic polymer(s) (1) used.

During the procedure of mixing the three components (1), (2) and (3) for preparation of the inventive crosslinkable composition, a point is reached in the process at which the power consumption in the mixing assembly assumes a constant value. For this, the mixing procedure for preparation of the crosslinkable composition has been concluded and the crosslinkable composition is present. The mixing procedure can, if necessary, be concluded at this juncture, and the crosslinkable composition can be obtained via quenching, i.e. lowering of the temperature, and also isolated if desired. In the event of continuation of the mixing procedure, whether immediately or after interruption as described, ionic crosslinking of the elastomer(s) takes place via the crosslinking system (3) and is discernible in that a rise takes place in the power consumption of the mixing assembly. Dynamic, but reversible crosslinking of the elastomer(s) takes place here.

Once phase inversion has taken place, the resultant crosslinked product, i.e. the thermoplastic elastomer, is rapidly cooled to a temperature below the melting point or glass transition temperature of the thermoplastic polymer(s).

After addition and dispersion of the specific salt (3) in the elastomer phase, the viscosity of the elastomer phase increases, and the resultant phase distribution arising for the thermoplastic phase and elastomer phase is that typical of TPVs.

The invention further provides the thermoplastic elastomers based on one or more thermoplastics and on one or more elastomers containing carboxy groups, where the elastomer(s) has been crosslinked via a crosslinking system which involves one or more salts of the general formula (I),

$$(R^{y-})_{x/y} M^{x+} \quad (I)$$

in which
$R^{y-}$ is a $C_1$-$C_{26}$ hydrocarbon radical which has y carboxy groups
y can be the values 1, 2, 3 or 4,
x is 3 or 4 and
M is a tri- or tetravalent metal.

All of the thermoplastic polymers, elastomers and other fillers to be used are non-hazardous substances, and the thermoplastic elastomers obtained are non-toxic, low-odour and colourless.

A feature of the inventive thermoplastic elastomers is that they have a thermoplastic phase and also an elastomer phase, the elastomers here having been mutually crosslinked as described. Unexpectedly, they have excellent high-temperature properties. Even at high temperatures demanded especially in automobile construction, markedly above 150° C. (i.e. even in temperature ranges where according to the prior art the strength of ionic bonding has begun to decrease) they have excellent physical and dynamic properties, e.g. high 100 modulus, and a high tensile strain at break and tensile stress at break. It is only after melting of the thermoplastic phase that the entire system becomes thermoplastically processable and the system therefore complies with the necessary preconditions for a thermoplastic elastomer, however without the need to resort irreversible crosslinking of the elastomer phase as in thermoplastic vulcanizates.

The invention therefore provides a method for the production of mouldings, preferably of drive belts, of gaskets, of sleeves, of hoses, of membranes, of dampers, of profiles, or for plastics-rubber mouldings by subjecting the inventive thermoplastic elastomers to injection moulding, co-injection moulding, extrusion or co-extrusion.

The mouldings obtained feature excellent physical properties, high-temperature resistance and oil resistance, these being of great significance for hoses, drive belts, membranes, gaskets, and bellows, e.g. for automobile applications and industrial applications. The mouldings can be produced in a simple manner in a single-stage process and feature excellent toxicological properties.

EXAMPLES

Materials used:
1. Therban® XT VP KA 8889: carboxylated hydrogenated nitrile rubber from Lanxess Deutschland GmbH CAN content: 33% by weight, Mooney viscosity (ML 1+4, 100° C.): 77, residual double bond content: 3.5%
2. Aluminium stearate: (Riedel De Haën), analytical grade
3. Krynac® X 7.50: nitrile rubber from Lanxess Deutschland GmbH containing carboxy groups CAN content 27% by weight, Mooney viscosity (ML 1+4, 100° C.): 47
4. Durethan® B40: polyamide from Lanxess Deutschland GmbH PA 6, injection-moulding grade, unreinforced, high viscosity, impact-resistant for parts subject to high load
5. Vulkasil® A1: precipitated silica from Lanxess Deutschland GmbH pH 10-12, surface area 60 m²/g, powder
6. Pretiox® AV-3: titanium dioxide from PRECHEZA a.s., uncoated
7. Vulkanox® SKF: stabilizer, sterically hindered polynuclear phenol from Lanxess Deutschland GmbH,
8. Vulkanox® BHT: stabilizer from Lanxess Deutschland GmbH, di-butyl-p-cresol
9. Therban® A 3407: hydrogenated nitrile rubber from Lanxess Deutschland GmbH CAN content: 34%, Mooney viscosity ML 1+4, 100° C.: 70, residual double bond content: <0.9%
10. Naugard® 445: stabilizer from Crompton-Uniroyal Chemical 4,4'-bis(alpha, alpha-dimethylbenzyl)diphenylamine
11. Irganox® 1035: stabilizer from Ciba Spezialitätenchemie sterically hindered phenol
12. Trigonox® A80: peroxide from Akzo Nobel, tert-butyl hydroperoxide, 80% in water All of the quantities are stated in phr (parts per hundred rubber) in the tables below. The elastomer component corresponds to 100 phr.

The main mixing assembly used was a E/3 Werner and Pfleiderer 1.5 l internal mixer with PES5 mixing geometry. In a typical mixing method, thermoplastic (Durethan® B40) and Elastomer (Therban® XT KA8889 or Krynac® X7.50 or Therban® A 3407) were used as initial charge together with the fillers, plasticizers and stabilizers in the internal mixer preheated to 200° C. The fill level of the internal mixer was about 75%.

The additional fillers were first dispersed in the elastomer phase via mixing at from 20 to 60 rpm, by way of introduction of shear energy over a period of about 2 min, and then, once the melting point or glass transition temperature of the thermoplastic had been reached, the elastomer phase and thermoplastic phase were dispersed in one another at up to 100 rpm. The rotation rate here was controlled in such a way that the mixing temperature did not exceed 250° C. After about 5 min, the temperature was lowered to about 230° C. by reducing the rotation rate to about 30 rpm, and the crosslinking agent was added.

While the rotation rate was held at 30 rpm for about 2 min, a temperature rise was observable, as also was the rise in the power consumption in the mixer, indicating the crosslinking of the elastomer phase. Mixing was then continued at the maximum rotation rate of 100 rpm for about 3 min in such a way that the temperature did not exceed 250° C. The total mixing time was about 12 min.

Once mixing had been completed, the mixture was discharged and cooled on a WNU3 roll mill from Troester, cooled to 40° C., with rolls of diameter 200 mm, and sheared to give the product in the form of crumb or powder.

In a Polystat 400P electrical press from Schwabenthan operating at a pressure of 200 bar, this powder was converted over 20 min at 230° C. into a suitable form from which specimens were stamped.

All of the comparative examples have been indicated by * in Table 1 below.

TABLE 1

Composition of mixture

| | Example: | | | | | | | |
|---|---|---|---|---|---|---|---|---|
| | 1 | 2* | 3* | 4 | 5 | 6 | 7 | 8* |
| Therban ® XT 8889 | 100 | 100 | — | 100 | 100 | 100 | — | — |
| Krynac ® X750 | — | — | — | — | — | — | 100 | 100 |
| Therban ® A 3407 | — | — | 100 | — | — | — | — | — |
| Durethan ® B40 | 67 | 67 | 67 | 100 | 42.9 | 53.8 | 60 | 60 |
| AV-03 Anatase titanium dioxide | — | — | — | — | — | — | 5 | 5 |
| Vulkanox ® SKF | — | — | — | — | — | — | 2 | 2 |
| Vulkanox ® BHT | — | — | — | — | — | — | 1.5 | 1.5 |
| Naugard ® 445 | 2.5 | 2.5 | 2.5 | — | — | — | — | — |
| Irganox ® 1035 | 1 | 1 | 1 | — | — | — | — | — |
| Trigonox ® A80 | — | 3.5 | 3.5 | — | — | — | — | — |
| Aluminium tristearate | 13.3 | — | — | 20 | 14.3 | 30.8 | 10 | — |

TABLE 2

Vulcanization conditions and product properties

| | | Example | | | | | | | |
|---|---|---|---|---|---|---|---|---|---|
| | | 1 | 2* | 3* | 4 | 5 | 6 | 7 | 8* |
| Vulcanization: | | takes place in a press | | | | | | | |
| Temp [° C.] | | 250 | | | | | | | |
| Time [min] | | 20 | | | | | | | |
| DIN 53504 tensile test | | | | | | | | | |
| F | MPa | 14.5 | 9.1 | 3.9 | 32.3 | 19.2 | 15.6 | 19 | 13.1 |
| D | % | 157 | 399 | 341 | 307 | 281 | 163 | 252 | 299 |
| S25 | MPa | 5.4 | 1.3 | 2.1 | 15.1 | 3.9 | 6.2 | 5.9 | 2.5 |
| S50 | MPa | 8.7 | 1.6 | 2.5 | 19.7 | 7.2 | 9.7 | 8.7 | 3.5 |
| S75 | MPa | 10.6 | 1.9 | 2.8 | 22.4 | 9.8 | 12 | 10.7 | 4.6 |
| S100 | MPa | 12 | 2.3 | 3 | 24.1 | 12 | 13.8 | 12.4 | 5.7 |
| S150 | MPa | 14 | 3.3 | 3.5 | 26.5 | 15 | 15.7 | 15 | 7.9 |
| 5200 | MPa | | 4.6 | 3.7 | 28.4 | 17.2 | 17.6 | 17.1 | 10 |
| S250 | MPa | | 6.1 | 3.8 | 30.2 | 18.8 | | 19 | 11.9 |
| S300 | MPa | | 7.4 | 3.9 | 32.1 | 21.2 | | | 13 |
| S350 | MPa | | 8.5 | 3.8 | | | | | |

The following advantages of the inventive composition can be discerned from the results of the experiments:

When comparison is made with a product (Example 2*) crosslinked by a traditional peroxidic method, the products crosslinked using aluminium stearate all exhibit higher tensile strengths while retaining values of up 300% for tensile strain at break. This performance is promoted via the interaction of the carbonyl functions in the polymers with the polyamide matrix and also via the strength of the ionic crosslinking. This is particularly markedly evident on comparison with a mixture based on HNBR which has no carboxy function (Therban® A 3407) (Example 3*). Analogous performance is observed when using XNBR (Krynac® X 750) in the inventive composition according to Example 7. If the ionic crosslinking agent system is omitted, markedly lower strengths are achieved (see composition according to Example 8*).

Comparison of Example 1 with a Commercially Available Thermoplastic Elastomer (Zeotherm™ 100-80B)

The "ANTEC Spring Meeting 2004" published the following Table 1 under the title "150° C. Heat- and Oil-Resistant TPVs—Long-Term Fluid and Spike Temperature Comparison" (Authors: Jeffrey E. Dickerhoof, Brian J. Cail, Samuel C. Harber):

|  | (a) ACM/PA | (b) COPE | (c) Si-TPV | (d) AEM |
|---|---|---|---|---|
| Tensile [MPa] | 9.30 | 14.20 | 7.50 | 19.10 |
| Elongation (%) | 200 | 650 | 563 | 372 |
| Hardness | 84A | 81A | 62A | 64A |
| Specific gravity | 1.15 | 1.02 | 1.20 | 1.35 | where:
(a) Zeotherm ™ 100-80B: A TPV based on polyacrylate (ACM) rubber and polyamide. Designated as "ACM//PA" (Zeon Chemicals L.P.)
(b) Hytrel 3078, A Low-durometer copolyester resin. Designated as "COPE" (E. I. DuPont).
(c) TPSiV 3040-65A, A low-durometer proprietary copolyester resin//silicone elastomer TPV. Designated as "Si-TPV" (Dow Corning/Multibase).
(d) Vamac AEM, an ethylene-acrylic thermoset elastomer compound. Designated AEM (E. I. DuPont).

Dynamic Mechanical Property Changes as a Function of Temperature:

The change in dynamic mechanical properties as a function of temperature was determined below for a specimen of the abovementioned material (a) ACM//PA (black curve) and for the inventive Example 1.

Figure 2:
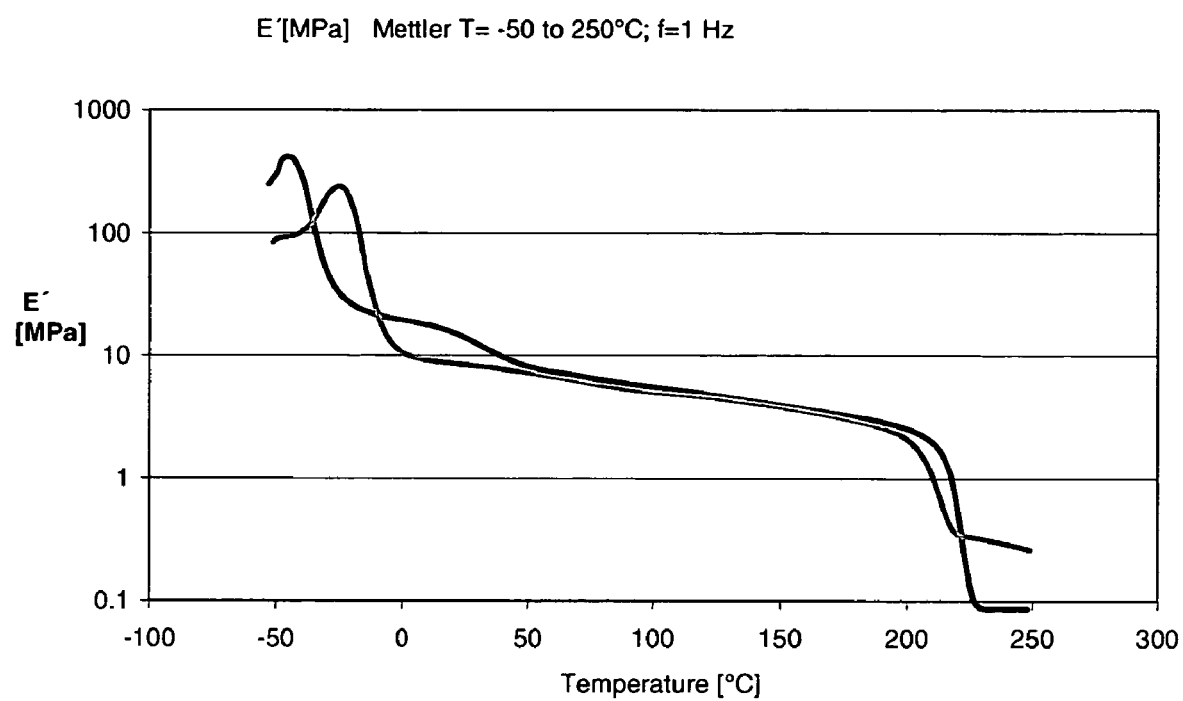

FIGS. 1 and 2 compare the corresponding property changes with one another for the two specimens.

FIGS. 1 and 2:

Black curve: Specimen (a) ACM//PA Zeotherm™ 100-80B

Grey curve: Example 1

Comparison with the commercially available product Zeotherm™ 100-80B, which is claimed to be oil-resistant, shows the superiority of the inventive systems in relation to strength. Direct comparison of dynamic mechanical performance with Zeotherm™ 100-80B, the preparation of which is based on ACM rubber and polyamide but using a different crosslinking system, shows equivalence in stability of properties (storage modulus E' and tan δ) with respect to temperature change, with the advantages mentioned in relation to strength. These advantages can be attributed inter alia to the superior phase distribution in the light of the particle sizes of the inventive system, as clearly shown by the transmission electron micrographs of the ACM//PA Systems (Zeotherm™ 100-80B) in FIG. 2a when compared with the inventive Example 1 in FIG. 2b.

The quality of phase distribution, in particular of the particle sizes, is known here to be a substantial quality criterion for the properties of TPV products.

Figure 2A:
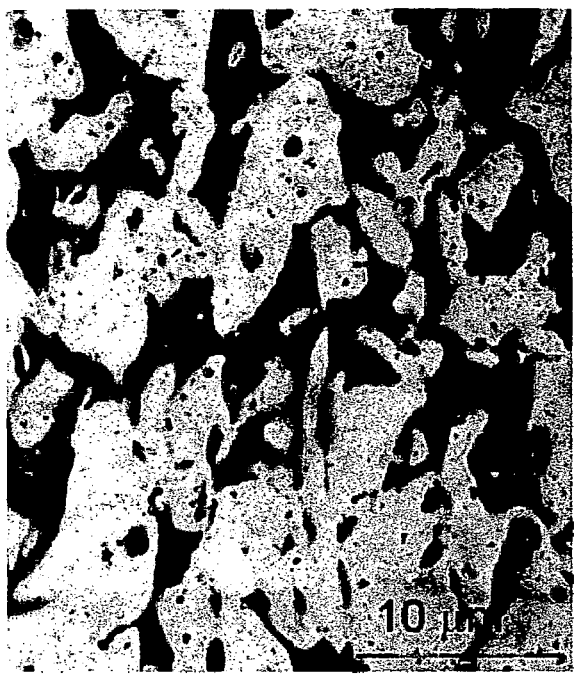
Figure 2B:

FIGS. 2a and 2b:

Transition electron micrograph of Zeotherm™ 100-80B and of the thermoplastic elastomer based on inventive Example 1.

What is claimed is:
1. Crosslinkable compositions comprising
   (1) one or more thermoplastic polymers
   (2) one or more elastomers which have carboxy groups, and also
   (3) as crosslinking system, one or more salts of the general formula (I)

$$(R^{y-})_{x/y}M^{x+} \quad (I)$$

in which
   $R^{y-}$ is a $C_1$-$C_{26}$ hydrocarbon radical which has y carboxy groups,
   y can be the values 1, 2, 3 or 4,
   x is 3 or 4 and
   M is a tri- or tetravalent metal.
2. Crosslinkable compositions according to claim 1 comprising
   (1) from 10 to 90% by weight of one or more thermoplastic polymers
   (2) from 89 to 9% by weight of one or more elastomers which have carboxy groups, and
   (3) from 1 to 40% by weight of a crosslinking system which involves one or more salts of the general formula (I)

$$(R^{y-})_{x/y}M^{x+} \quad (I)$$

in which
   $R^{y-}$ is a $C_1$-$C_{26}$ hydrocarbon radical which has y carboxy groups,
   y can be the values 1, 2, 3 or 4,
   x is 3 or 4 and
   M is a tri- or tetravalent metal,
   where the entirety of the three components (1), (2) and (3) gives 100% by weight.
3. Crosslinkable compositions according to claim 1 comprising
   (1) from 15 to 80% by weight of one or more thermoplastic polymers
   (2) from 83 to 18% by weight of one or more elastomers which have carboxy groups, and
   (3) from 2 to 30% by weight of a crosslinking system which involves one or more salts of the general formula (I)

$$(R^{y-})_{x/y}M^{x+} \quad (I)$$

in which
   $R^{y-}$ is a $C_1$-$C_{26}$ hydrocarbon radical which has y carboxy groups,
   y can be the values 1, 2, 3 or 4,
   x is 3 or 4 and
   M is a tri- or tetravalent metal,
   where the entirety of the three components (1), (2) and (3) gives 100% by weight.
4. Crosslinkable compositions according to claim 1, wherein M is B, Al, Sc, Y, Fe, Sn, Pb, Ti, or Hf.
5. Crosslinkable compositions according to claim 1, wherein the $C_1$-$C_{26}$ hydrocarbon radical ($R^{y-}$) is straight-chain or branched, saturated or else mono- or polyunsaturated, acyclic or cyclic, aliphatic or aromatic.
6. Crosslinkable compositions according to claim 1, wherein $R^{y-}$ is formate, acetate, acrylate, methacrylate, propionate, lactate, crotonate, pivalate, capronate, sorbate, caprylate, oleate, caprate, laurate, linolate, palmate, stearate, resinate, hexacosanate, icopentenate, eicosapentanate, oxalate, malonate, maleate, fumarate, succinate, glutarate, adipate, salicylate, pimelate, terephthalate, isophthalate, citrate or pyromellitate.
7. Crosslinkable compositions according to claim 1, wherein the composition comprises, as crosslinking system, exclusively the crosslinking system (3).
8. Crosslinkable compositions according to claim 1, wherein, as thermoplastic polymers (1), thermoplastic polymers whose melting point or glass transition temperature is >90° C.
9. Crosslinkable compositions according to claim 1, wherein the elastomer (2) contains from 0.5 to 15% by weight, based on 100% by weight of elastomer (2), of carboxy groups.

10. Crosslinkable compositions according to claim 1, wherein, as elastomer (2), carboxylated nitrile rubber (XNBR), hydrogenated, carboxylated nitrile rubber (HXNBR), maleic-anhydride-("MAH")-grafted rubbers based on EPM, EPDM, HNBR, EVA, EVM, SBR, NR or BR or carboxylated styrene-butadiene rubber (XSBR), AEM having free carboxy groups, ACM having free carboxy groups or any desired mixture of these elastomers is used.

11. Crosslinkable compositions according to claim 1, wherein, as component (1), a polyamide is used and, as component (2), HXNBR or XNBR is used.

12. Process for preparation of the crosslinkable compositions according to claim 1, by mixing all of the components (1), (2) and (3) at temperatures above the highest melting point or glass transition temperature of the thermoplastic polymer(s).

13. Process for preparation of a thermoplastic elastomer based on one or more thermoplastic polymers (1) and on one or more elastomers (2) containing carboxy groups, by subjecting the crosslinkable composition according to one or more of claims 1 to 11 to a continued mixing procedure at a temperature which is above the highest melting point or glass transition temperature of the thermoplastic polymer(s) (1) used.

14. Thermoplastic elastomers based on one or more thermoplastics (1) and on one or more elastomers (2) containing carboxy groups, where the elastomer(s) (2) containing carboxy groups has/have been crosslinked via a crosslinking system which involves one or more salts of the general formula (I),

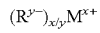  (I)

in which
$R^{y-}$ is a $C_1$-$C_{26}$ hydrocarbon radical which has y carboxy groups,
y can be the values 1, 2, 3 or 4,
x is 3 or 4 and
M is a tri- or tetravalent metal.

15. A method for the production of mouldings, preferably of drive belts, of gaskets, of sleeves, of hoses, of membranes, of dampers, of profiles, or for plastics-rubber mouldings, comprising subjecting the thermoplastic elastomers according to claim 14 to injection moulding, co-injection moulding, extrusion, or co-extrusion.

16. Mouldings obtainable according to claim 15.

17. The crosslinkable composition according to claim 8, wherein the thermoplastic polymer has a melting point or glass transition temperature greater than 120° C.

18. The crosslinkable composition according to claim 8, wherein the thermoplastic polymer is selected from the group consisting of polyamides, polyesters, polyimides or polypropylene.

19. The crosslinkable composition according to claim 9, wherein the elastomer (2) contains from 0.5 to 10% of carboxy groups.

20. The crosslinkable composition according to claim 19, wherein the elastomer (2) contains from 1 to 7% of carboxy groups.

21. The crosslinkable composition according to claim 20, wherein the elastomer (2) contains from 2 to 5% of carboxy groups.

* * * * *